US012752513B2

(12) United States Patent
Bernard et al.

(10) Patent No.: US 12,752,513 B2
(45) Date of Patent: Oct. 6, 2026

(54) POLYETHYLENE LAMINATE AND ARTICLES COMPRISING SUCH A LAMINATE

(71) Applicant: TOTALENERGIES ONETECH, Courbevoie (FR)

(72) Inventors: Pierre Bernard, Seneffe (BE); Christian Penu, Seneffe (BE); Stéphane Lombardo, Seneffe (BE)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

(21) Appl. No.: 19/106,947

(22) PCT Filed: Aug. 22, 2023

(86) PCT No.: PCT/EP2023/073057

§ 371 (c)(1),
(2) Date: Feb. 26, 2025

(87) PCT Pub. No.: WO2024/046819

PCT Pub. Date: Mar. 7, 2024

(65) Prior Publication Data

US 2025/0353277 A1 Nov. 20, 2025

(30) Foreign Application Priority Data

Aug. 29, 2022 (EP) .................................... 22315193

(51) Int. Cl.
*B32B 7/022* (2019.01)
*B32B 27/08* (2006.01)
*B32B 27/32* (2006.01)

(52) U.S. Cl.
CPC .............. *B32B 7/022* (2019.01); *B32B 27/08* (2013.01); *B32B 27/32* (2013.01); *B32B 2250/05* (2013.01); *B32B 2307/516* (2013.01); *B32B 2307/518* (2013.01); *B32B 2307/72* (2013.01); *B32B 2307/7376* (2023.05)

(58) Field of Classification Search
CPC ............ B32B 2250/02; B32B 2250/05; B32B 2250/24; B32B 2250/242; B32B 2250/246; B32B 2270/00; B32B 2272/00; B32B 2307/30; B32B 2307/31; B32B 2307/516; B32B 2307/518; B32B 2307/544; B32B 2307/546; B32B 2307/558; B32B 2307/581; B32B 2307/72; B32B 2307/732; B32B 2307/7376; B32B 2439/06; B32B 2439/46; B32B 2439/70; B32B 27/08; B32B 27/30; B32B 27/304; B32B 27/306; B32B 27/32; B32B 27/327; B32B 27/34; B32B 7/022; B32B 7/12
See application file for complete search history.

(56) References Cited

U.S. PATENT DOCUMENTS

| | | | |
|---|---|---|---|
| 9,676,169 | B2 | 6/2017 | Paulino |
| 2022/0072832 | A1 | 3/2022 | Sandkuehler et al. |
| 2022/0072837 | A1 | 3/2022 | Liao et al. |

FOREIGN PATENT DOCUMENTS

| | | |
|---|---|---|
| CN | 114132613 | 3/2022 |
| WO | WO 2021/247162 | 12/2021 |
| WO | WO 2022/227014 | 11/2022 |
| WO | WO 2024/068314 | 4/2024 |

OTHER PUBLICATIONS

PCT International Search Report and Written Opinion issued in International Application No. PCT/EP2023/073057, dated Oct. 24, 2023.

PCT Notification of Transmittal of the International Preliminary Report on Patentability issued in International Application No. PCT/EP2023/073057, dated Jul. 18, 2024.

*Primary Examiner* — Lawrence D Ferguson
(74) *Attorney, Agent, or Firm* — NORTON ROSE FULBRIGHT US LLP

(57) ABSTRACT

The disclosure provides a laminate comprising at least a first film and a second film, wherein the first film is a machine-direction-oriented polyethylene (MDO-PE) film selected from a monolayered film or a multi-layered film comprising at least two layers, and the second film is a biaxially-oriented polyethylene (BOPE) film or a machine-direction-oriented polyethylene (MDO-PE) film; wherein the second film has a sealing initiation temperature (SIT) equal to or lower than 128° C. as determined by the method described in the description and is selected from a monolayered film or a multi-layered film comprising at least two layers and wherein the single layer or at least one layer comprises a high-density polyethylene having a density of at least 0.945 g/cm$^3$ as determined according to ISO 1183-1:2012 at 23° C.

20 Claims, No Drawings

POLYETHYLENE LAMINATE AND ARTICLES COMPRISING SUCH A LAMINATE

This application is a national phase application under 35 U.S.C. § 371 of International Application No. PCT/EP2023/073057, filed Aug. 22, 2023, which claims priority to European Patent Application No. 22315193.7, filed Aug. 29, 2022. The contents of the referenced applications are incorporated into the present application by reference.

TECHNICAL FIELD

The present disclosure relates to polyethylene laminates having improved recyclability and articles produced from such laminates.

TECHNICAL BACKGROUND

As global interest in reducing packaging waste is growing, there is an increasing amount of effort to develop technologies that would enhance the possibility to recycle plastic products such as films. Flexible packaging film structures are often formed of multiple types of polymeric materials including polyethylene, polypropylene, ethylene vinyl alcohol, polyethylene terephthalate, polyamide, and others. Such materials are typically combined to achieve a balance of properties that are beyond the reach of a single material type (i.e., mono-material type). However, due to the dissimilarity of these materials, the final package is typically not easy to recycle. Thus, there is also a movement towards mono-material structures (e.g., all polyethylene structures) to improve the recyclability profile.

There is, therefore, a need for films made of polyethylene (PE) that show the same or at least comparable mechanical and/or optical properties as pluri-material films, while improving recyclability.

WO2021069669 describes a package for storing frozen matter, preferably food products, comprising a laminate, wherein the laminate comprises at least a first layer and a second layer, wherein the first layer is a bi-directionally oriented polyethylene (BOPE) film layer, and the second layer is a second polyethylene film layer; wherein the package comprises at least 90.0 wt. % of polyethylene with regard to the total weight of the laminate. The second layer is the sealing layer. The laminate described is interesting, but there is a need for further improvements. In particular, needs exist for thinner films with the same or improved mechanical properties. Indeed, thinner films allow using less plastic material and therefore reduce the overall quantity of plastic to recycle.

US2022072832 describes laminates comprising a uniaxially oriented first multilayer film comprising an ethylene-based polymer, wherein the uniaxially oriented first multilayer film has a ratio of percent elongation at break in the cross direction to percent elongation at break in the machine direction of at least 2 to 1; a biaxially oriented second multilayer film adhered to the uniaxially oriented first multilayer film and comprising an ethylene-based polymer, wherein the biaxially oriented second multilayer film has a ratio of percent elongation at break in the machine direction to percent elongation at break in the cross direction of at least 2 to 1; and a third film adhered to the biaxially oriented second multilayer film such that the biaxially oriented second multilayer film is disposed between the uniaxially oriented first multilayer film and the third film, wherein the third film comprises an ethylene-based polymer.

US2022072837 describes laminates comprising a uniaxially oriented first multilayer film comprising an ethylene-based polymer, wherein the uniaxially oriented first multilayer film has a ratio of percent elongation at break in the cross direction to percent elongation at break in the machine direction of at least 2 to 1; and a biaxially oriented second multilayer film adhered to the uniaxially oriented first multilayer film and comprising an ethylene-based polymer, wherein the biaxially oriented second multilayer film has a ratio of percent elongation at break in the machine direction to percent elongation at break in the cross direction of at least 2 to 1. CN114132613 relates to a container comprising a laminate of polyethylene, wherein the laminate comprises a first longitudinally oriented polyethylene (MDO-PE) layer, a second biaxially oriented polyethylene (BO-PE) layer, and a third polyethylene (PE) layer.

WO2021/247162 relates to barrier laminates including polyethylene which offer heat resistance and a wide sealing window. The laminates can be fully compatible with polyethylene recycling streams and can exhibit improved, maintained, or desirable properties in comparison to existing laminate structures that are not fully compatible with polyethylene recycling streams. The laminate comprises a multilayer film, a polyethylene film, and an adhesive. The adhesive adheres the multilayer film to the polyethylene film to provide the laminate.

WO2022/041053 relates to multilayer structures and articles comprising the same. The multilayer structure comprises: a biaxially-oriented polyethylene film comprising a skin layer with a matte surface and a core, the core comprising one or more core layers; a sealant film; and an adhesive adhering the sealant film to the matte surface of the skin layer of the biaxially-oriented polyethylene film. The multilayer structure can exhibit an enhanced adhesive bonding force in comparison to other multilayer structures.

WO2017/000339 relates to multilayer structures and articles formed therefrom. In one aspect, a multilayer structure comprises: (a) a biaxially oriented polyethylene film comprising a linear low-density polyethylene having a density of 0.910 to 0.940 g/cm$^3$, wherein the ultimate elongation in the machine direction of the biaxially oriented polyethylene film is at least 2 times greater than the ultimate elongation in the cross direction, and wherein the ultimate tensile strength of the biaxially oriented polyethylene film is at least 60 MPa in at least one of the machine direction and the cross direction; (b) an adhesive layer; and (c) a sealant film, wherein the ultimate elongation of the sealant film is at least 300% in at least one of the machine direction and the cross direction, wherein the ultimate tensile strength of the sealant film is less than 50 MPa in at least one of the machine direction and the cross direction, and wherein the sealant film has a heat seal initiation temperature of 105° C. or less; wherein the sealant film is laminated to the biaxially oriented polyethylene film by the adhesive. In some embodiments, the sealant film comprises at least one layer comprising at least 30 percent by weight of a polyolefin plastomer, a polyolefin elastomer, an ultra-low-density polyethylene, an ethylene acetate copolymer, an ethylene acrylic acid copolymer, or an ethylene acrylate copolymer.

The present disclosure aims to provide a solution to one or more of the aforementioned drawbacks and problems. In particular, the present disclosure aims to provide a laminate that shows an improvement in the balance of mechanical properties including stiffness and puncture resistance together with improved recyclability and reduced thickness. The present disclosure also aims to provide a laminate that shows an improvement in the balance of mechanical properties including strength at break MD, dart resistance, stiffness and puncture resistance together with improved recyclability and reduced thickness. The present disclosure aims to provide a laminate that shows an improvement in the balance of optical properties and mechanical properties, including stiffness and puncture resistance, together with improved recyclability and reduced thickness.

SUMMARY

Surprisingly, it has been found that the above objectives can be attained either individually or in combination, by the use of a laminate comprising at least two oriented polyethylene films, wherein the laminate comprises a first film being a machine-direction-oriented polyethylene (MDO-PE) film and a second film being a biaxially-oriented polyethylene (BOPE) film or a machine-direction-oriented polyethylene (MDO-PE) film; wherein the second film comprises a sealing layer.

According to a first aspect, the disclosure provides a laminate comprising at least a first film and a second film, remarkable in that:

- the first film is a machine-direction-oriented polyethylene (MDO-PE) film selected from a monolayered film or a multi-layered film comprising at least two layers; and
- the second film is a biaxially-oriented polyethylene (BOPE) film or a machine-direction-oriented polyethylene (MDO-PE) film; wherein the second film has a sealing initiation temperature (SIT) equal to or lower than 128° C. as determined by the method described in the method section and is selected from a monolayered film or a multi-layered film comprising at least two layers; wherein the single layer or at least one layer comprises a high-density polyethylene having a density of at least 0.945 g/cm$^3$ as determined according to ISO 1183-1:2012 at 23° C.

Indeed, in a laminate comprising two PE films (so that recyclability is improved) it was found that the use of an oriented film to form the sealing layer of a laminate allows for reducing the overall thickness of said laminate while keeping the same mechanical properties and/or while improving them.

In a preferred embodiment, the second film is a biaxially-oriented polyethylene (BOPE) film or a machine-direction-oriented polyethylene (MDO-PE) film, and has a sealing initiation temperature (SIT) equal to or lower than 128° C. as determined by the method described herein after, and is selected from a monolayered film or a multi-layered film comprising at least two layers. The use of an oriented film (MDO-PE or BOPE film) as a sealing layer (i.e., as the second film) allows obtaining an improvement in the balance of mechanical properties including strength at break MD, dart resistance, stiffness, and puncture resistance. In particular, the laminate shows an improvement in the balance of mechanical properties including strength at break MD, stiffness, and puncture resistance together with improved recyclability and reduced thickness.

In a preferred embodiment, the use of a BOPE film as a sealing layer allows obtaining a further improvement in the balance of mechanical properties including strength at break MD, dart resistance, stiffness, and puncture resistance.

For example, the second film has a sealing initiation temperature (SIT) equal to or lower than 127° C. or equal to or lower than 126° C. as determined by the method described in the method section of the description; more preferably, equal to or lower than 125° C.; even more preferably, equal to or lower than 123° C.; most preferably, equal to or lower than 122° C. or equal to or lower than 120° C.; and even most preferably, equal to or lower than 118° C. or equal to or lower than 117° C. or equal to or lower than 115° C.

One or More of the Following May be Used to Further Define the First Film being a Machine-Direction-Oriented Polyethylene Film For example, the first film comprises at least two layers of polyethylene wherein the melt index of the polyethylene of one layer is greater than the melt index of the polyethylene of the other layer and wherein both polyethylenes have met index in the range of from 0.1 to 5.0 g/10 min as determined according to ISO 1133-2005 at 190° C. under a load of 2.16 kg; preferably from 0.2 to 3.0 g/10 min; more preferably from 0.3 to 2.0 g/10 min and even more preferably from 0.4 to 1.8 g/10 min.

For example, the first film comprises at least one layer comprising a high-density polyethylene having a density of at least 0.940 g/cm$^3$ as determined according to ISO 1183-1:2012 at 23° C.

When the first film is monolayered film, the single layer comprises a high-density polyethylene having a density of at least 0.940 g/cm$^3$ as determined according to ISO 1183-1:2012 at 23° C.

For example, the first film is multi-layered and comprises one or two skin layers comprising high-density polyethylene having a density of at least 0.950 g/cm$^3$ as determined according to ISO 1183-1:2012 at 23° C.

For example, the first film comprises two skin layers comprising polyethylene wherein the polyethylene of at least one skin layer has a density greater than the polyethylene of one or more inner layers selected from an intermediate layer or a core layer.

In an embodiment, the first film comprises at least one layer comprising a blend of at least two different polyethylenes, wherein the blend comprises from 60 to 99.9 wt. % of a high-density polyethylene based on the total weight of the blend; wherein the high-density polyethylene having a density of at least 0.940 g/cm$^3$ as determined according to ISO 1183-1:2012 at 23° C.; with preference ranging from 70 to 95 wt. %, or from 75 to 90 wt. %. In an embodiment, the one or more other polyethylene present in the blend are linear low-density polyethylene.

For example, the first film is multi-layered and comprises at least two layers of polyethylene, wherein at least one layer comprising a high-density polyethylene having a density of at least 0.940 g/cm$^3$ as determined according to ISO 1183-1:2012 at 23° C.

For example, the first film is multi-layered and comprises two skin layers, one or more optional intermediate layers and one or more optional core layers, and the first film comprises at least one layer comprising a high-density polyethylene having a density of at least 0.940 g/cm$^3$ as determined according to ISO 1183-1:2012 at 23° C., wherein the one or more high-density polyethylene layers are selected from a skin layer, an intermediate layer, a core layer, or a combination thereof. For example, the first film comprises at least one of the skin layers comprising high-density polyethylene having a density of at least 0.940 g/cm$^3$ as determined according to ISO 1183-1:2012 at 23° C.; with preference, at least 0.950 g/cm$^3$.

In an embodiment, wherein the first film is multi-layered and comprises two skin layers comprising polyethylene wherein the polyethylene of at least one skin layer has a density greater than the polyethylene of one or more inner layers selected from an intermediate layer or a core layer.

In an embodiment, the first film is multi-layered and comprises at least one layer being a complementary layer and made of or comprising a polymer selected from the group comprising ethylene vinyl acetate (EVA), plastomers, elastomers, ethylene vinyl alcohol (EVOH), polymers of vinylidene fluoride, copolymers of vinylidene fluoride, poly (lactic acid), polyamides, and any mixture thereof. With preference, at least one complementary layer is a ethylene-vinyl alcohol copolymer layer.

In an embodiment, the first film is multi-layered and comprises at least one complementary layer having a first surface and a second surface, a first tie-layer adhesive bonded to the first surface and a second tie-layer adhesive bonded to the second surface of the complementary layer. With preference, the first tie-layer and/or the second tie-layer comprises maleic anhydride grafted polyethylene.

In an embodiment, the first film is multi-layered and comprises at least five layers.

In an embodiment, the first film has a thickness of at most 40 μm as determined by DIN ISO 4593; preferably at most 35 μm; and more preferably at most 30 μm.

In an embodiment, the first film and/or the second film is a machine-direction-oriented polyethylene film comprising at least 80 wt. % of metallocene-catalysed polyethylene based on the total weight of the machine-direction-oriented polyethylene film. The use in the laminate of an MDO-PE film (as the first film and/or the second film) comprising metallocene-catalysed polyethylene further improves the optical properties of the film.

Optionally, the first film comprises at least one layer comprising a linear low-density polyethylene (LLDPE); wherein the linear low-density polyethylene:

is a copolymer of ethylene and 1-hexene; and/or has a density of at least 0.910 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

In an embodiment, the first film comprises at least one layer comprising a high-density polyethylene (HDPE); with preference, the high-density polyethylene is a homopolymer of ethylene or a copolymer of ethylene and 1-hexene; and/or has a density of at least 0.940 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

In an embodiment, the first film and/or the second film is a machine-direction-oriented polyethylene film and comprises at least one layer comprising a high-density polyethylene: wherein high-density polyethylene is a recycled material selected from a post-consumer resin (PCR), a post-industrial resin (PIR), and a mixture thereof; with preference, the high-density polyethylene is a recycled material being a post-industrial resin.

One or More of the Following May be Used to Further Define the Second Film being a Machine-Direction-Oriented Polyethylene Film or a Biaxially-Oriented Polyethylene Film For example, the second film comprises at least two layers of polyethylene wherein the melt index of the polyethylene of one layer is greater than the melt index of the polyethylene of the other layer and wherein both polyethylenes have met index in the range of from 0.1 to 5.0 g/10 min as determined according to ISO 1133-2005 at 190° C. under a load of 2.16 kg; preferably from 0.2 to 3.0 g/10 min; more preferably from 0.3 to 2.0 g/10 min and even more preferably from 0.4 to 1.8 g/10 min.

In a preferred embodiment, the second film comprises at least one layer being a single layer or a skin layer and comprising a linear low-density polyethylene (LLDPE); wherein the linear low-density polyethylene:

is a copolymer of ethylene and 1-hexene; and/or has a density of at least 0.910 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

According to the disclosure, the second film is selected from a monolayered film or a multi-layered film comprising at least two layers; wherein the single layer or at least one layer comprises a high-density polyethylene (HDPE) having a density of at least 0.945 g/cm$^3$ as determined according to ISO 1183-1:2012 at 23° C.; with preference, the high-density polyethylene is an homopolymer of ethylene or a copolymer of ethylene and 1-hexene; and/or has a density of at least 0.948 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

When the second film is a multilayer film the at least one HDPE-containing layer can be a skin layer, an intermediate layer and/or a core layer.

In an embodiment, the second film is a multilayer film and at least one layer selected from an intermediate layer and a core layer comprises a high-density polyethylene (HDPE) having a density of at least 0.945 g/cm$^3$ as determined according to ISO 1183-1:2012 at 23° C.

In an embodiment, the second film is a multilayer film and at least one skin layer comprises a high-density polyethylene (HDPE) having a density of at least 0.945 g/cm$^3$ as determined according to ISO 1183-1:2012 at 23° C.

In an embodiment, the second film is a multilayer film and all layers comprises a high-density polyethylene (HDPE) having a density of at least 0.945 g/cm$^3$ as determined according to ISO 1183-1:2012 at 23° C.

In an embodiment, the second film comprises at least one layer being a complementary layer and made of or comprising a polymer selected from the group comprising ethylene vinyl acetate (EVA), plastomers, elastomers, ethylene vinyl alcohol (EVOH), polymers of vinylidene fluoride, copolymers of vinylidene fluoride, poly(lactic acid), polyamides, and any mixture thereof. With preference, at least one complementary layer is ethylene-vinyl alcohol copolymer layer.

In an embodiment, the second film the second film comprises at least one complementary layer having a first surface and a second surface, a first tie-layer adhesive bonded to the first surface and a second tie-layer adhesive bonded to the second surface of the complementary layer; with preference, the tie layers comprise maleic anhydride grafted polyethylene.

For example, the second film comprises at least one layer comprising a blend of a linear low-density polyethylene and one or more polymers selected from the group comprising ethylene vinyl acetate (EVA), plastomers, elastomers, ethylene vinyl alcohol (EVOH), polymers of vinylidene fluoride, copolymers of vinylidene fluoride, poly(lactic acid), polyamides, and any mixture thereof; with preference, the second film comprises at least one layer being a skin layer comprising a blend of polyethylene and one or more plastomers; and/or one or more plastomers are present in the blend at a content of at most 10 wt. % based on the total weight of the blend; preferably from 0.1 to 5 wt. %.

In an embodiment, the second film comprises at least one layer being a single layer or a skin layer and comprising a blend of linear low-density polyethylene and high-density polyethylene.

In an embodiment, the second film comprises at least one layer being a single layer or a skin layer and comprising a blend of linear low-density polyethylene and high-density polyethylene; wherein the linear low-density polyethylene is present in the blend at a content ranging from 60 to 99.9 wt. % based on the total weight of the blend; with preference ranging from 70 to 95 wt. % or ranging from 75 to 90 wt. %.

In an embodiment, the second film comprises at least three layers including the two skin layers and at least one inner layer selected from a core layer and an intermediate layer; wherein at least one inner layer comprises a high-density polyethylene. With preference the high-density polyethylene is a recycled material selected from a post-consumer resin (PCR), a post-industrial resin (PIR), and a mixture thereof; and/or the high-density polyethylene has a density of at least 0.940 g/cm$^3$ as determined according to ISO 1183-1:2012 at 23° C. In an embodiment, the second film comprises at least three layers including the two skin layers and one core layer, at least one of the skin layers comprising a linear low-density polyethylene (LLDPE).

In an embodiment, the second film being a biaxially-oriented polyethylene film has a thickness of at most 30 μm as determined by DIN ISO 4593; preferably at most 25 μm.

In an embodiment, the second film being a machine-direction-oriented polyethylene film has a thickness of at most 40 μm as determined by DIN ISO 4593; preferably at most 35 μm; and more preferably at most 30 μm.

One or More of the Following May be Used to Further Define the Laminate

In an embodiment, the laminate has a thickness of at most 70 μm as determined by DIN ISO 4593; preferably at most 60 μm; more preferably at most 55 μm or et most 50 μm; even more preferably at most 48 μm or at most 45 μm. For comparison purposes, it can be noted that PET/PE laminates have a typical thickness that is above 80 μm and the PA/PE laminates have a typical thickness that is above 60 μm. The laminate of the disclosure is interesting in that it combines the improvement in recyclability provided by a high content of polyethylene with a thickness reduction; i.e., the use of less polymer; which is also desirable. The laminate of the disclosure allows recyclability while for multi-material structures is most of the time not possible.

In an embodiment, the first film and the second film are bonded together via lamination wherein the bonding occurs via an adhesive layer positioned between the first film and the second film. With preference, the adhesive layer is polyurethane-based.

For example, the laminate comprises polyethylene at a content of at least 80 wt. % based on the total weight of the laminate; preferably, at least 85 wt. %; more preferably, at least 90 wt. %; even more preferably, at least 95 wt. %; and most preferably, at least 97 wt. % or at least 98 wt. % or at least 99 wt. %.

According to a second aspect, the disclosure provides an article remarkable in that it comprises the laminate according to the first aspect. With preference, the article is selected from a bag, a pouch, a stand-up pouch, a pillow pouch, a three-side seal pouch, a seal pouch, an air cushion bag, a bag, or a package.

According to a third aspect, the disclosure provides a process for producing laminate remarkable in that it comprises providing a first film being a machine-direction-oriented polyethylene (MDO-PE) film being a monolayered film or a multi-layered film comprising at least two layers; providing a second film is a biaxially-oriented polyethylene (BOPE) film or a machine-direction-oriented polyethylene (MDO-PE) film wherein the second film is selected from a monolayered film or a multi-layered film comprising at least two layers; wherein the biaxially-oriented polyethylene film comprises at least one layer comprising a linear low-density polyethylene; and bounding together, via lamination, the first film and the second film to obtain a laminate according to the first aspect. With preference, the bonding occurs via an adhesive layer positioned between the first film and the second film.

According to a fourth aspect, the disclosure provides a process for producing a laminate characterized in that it comprises providing a first film being a machine-direction-oriented polyethylene film being a monolayered film or a multi-layered film comprising at least two layers; providing a second film is a biaxially-oriented polyethylene film a machine-direction-oriented polyethylene film wherein the second film has a sealing initiation temperature equal to or lower than 128° C. as determined by the method described hereafter and is selected from a monolayered film or a multi-layered film comprising at least two layers; wherein the single layer or at least one layer comprises a high-density polyethylene having a density of at least 0.945 g/cm$^3$ as determined according to ISO 1183-1:2012 at 23° C. and bounding together via lamination the first film and the second film to obtain a laminate according to the first aspect;

with preference, the bonding occurs via an adhesive layer positioned between the first film and the second film.

DETAILED DESCRIPTION

When describing the polymers, uses and processes of the disclosure, the terms employed are to be construed by the following definitions, unless a context dictates otherwise. For the disclosure, the following definitions are given:

As used herein, the singular forms “a”, “an”, and “the” include both singular and plural referents unless the context dictates otherwise. By way of example, “a resin” means one resin or more than one resin.

The terms “comprising”, “comprises” and “comprised of” as used herein are synonymous with “including”, “includes” or “containing”, “contains”, and are inclusive or open-ended and do not exclude additional, non-recited members, elements or method steps. It will be appreciated that the terms “comprising”, “comprises” and “comprised of” as used herein comprise the terms “consisting of”, “consists” and “consists of”.

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of end points also includes the endpoint values themselves (e.g., from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

The terms "polyethylene" (PE) and "ethylene polymer" may be used synonymously. The term "polyethylene" encompasses ethylene homopolymer as well as ethylene copolymer resin which can be derived from ethylene and one or more comonomers selected from the group consisting of $C_3$-$C_{20}$ alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The term "high-density polyethylene", which may be abbreviated as "HDPE", is generally used to denote polyethylene having a density of at least 0.940 g/cm$^3$ as determined according to ISO 1183-1:2012 at 23° C.

The terms "polyethylene resin", "ethylene homopolymer resin" or "ethylene copolymer resin" refer to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin". The terms "fluff" or "powder" refer to polyethylene material with the hard catalyst particle at the core of each grain and is defined as the polymer material after it exits the polymerization reactor (or the final polymerization reactor in the case of multiple reactors connected in series).

The terms "Post-Consumer Resin", which may be abbreviated as "PCR", is used to denote the components of domestic waste, household waste or end-of-life vehicle waste. In other words, the PCRs are made of recycled products from waste created by consumers. The terms "Post-Industrial Resin", which may be abbreviated as "PIR", is used to denote the waste components from pre-consumer resins during packaging processes. In other words, the PIRs are made of recycled products created from scrap by manufacturers.

Under normal production conditions in a production plant, it is expected that the melt index (MI2, HLMI, MI5) will be different for the fluff than for the polyethylene resin. Under normal production conditions in a production plant, it is expected that the density will be slightly different for the fluff than for the polyethylene resin. Unless otherwise indicated, density and melt index for the polyethylene resin refer to the density and melt index as measured on the polyethylene resin as defined above.

The present disclosure provides a laminate comprising at least a first film and a second film, wherein the first film is a machine-direction-oriented polyethylene (MDO-PE) film selected from a monolayered film or a multi-layered film comprising at least two layers; and the second film is a biaxially-oriented polyethylene (BOPE) film or a machine-direction-oriented polyethylene (MDO-PE) film; wherein the second film has a sealing initiation temperature (SIT) equal to or lower than 128° C. as determined by the method described hereafter and is selected from a monolayered film or a multi-layered film comprising at least two layers; wherein the single layer or at least one layer comprises a high-density polyethylene having a density of at least 0.945 g/cm$^3$ as determined according to ISO 1183-1:2012 at 23° C.

It is desirable to ensure that the laminate comprises a certain high fraction of polymer material that belongs to the same class of material. For example, the laminate comprises polyethylene at a content of at least 80 wt. % based on the total weight of the laminate; preferably, at least 85 wt. %; more preferably, at least 90 wt. %; even more preferably, at least 95 wt. %; and most preferably, at least 97 wt. % or at least 98 wt. % or at least 99 wt. %.

The first film and the second film may for example be bonded together via lamination, the first film and the second film are bonded together via lamination at a temperature ranging from 15 to 25° C. Optionally a corona treatment (38-40 Dyn) is applied.

The first film and the second film may for example be bonded together via lamination wherein the bonding occurs via an adhesive layer positioned between the first film and the second film. Such adhesive layer may for example be in the form of a polyurethane-based adhesive, wherein the adhesive may be a water-based adhesive, a solvent-based adhesive or a solvent-free adhesive. The lamination processes are known to the person skilled in the art.

The laminate may be formed by applying the adhesive to a surface of the first or the second film, and contacting that surface to a surface of the second film, preferably by applying a contact pressure. Such lamination may be performed in a continuous process, where the film to which the adhesive layer is applied is contacted with the other film, wherein the contact pressure is provided by continuously rotating nip rollers, following which the laminate is spooled onto a roll.

In an alternative embodiment, the adhesive layer is a melt adhesive layer, which is applied to a film surface in molten form. Such melt adhesive layer may for example be a thermoplastic material that demonstrates appropriate adhesion to both the first and the second film. For example, such melt adhesive layer may be a polyethylene-based material. This embodiment provides a further advantage in that the content of polyethylene material in the laminate is increased, and thereby the suitability of the materials for recycling as a mono-material product.

Particularly, such polyethylene-based material that may be used as melt adhesive layer may be a functionalised polyethylene, such as a maleic anhydride-grafted polyethylene. Such polyethylene demonstrates excellent adhesive properties and thereby is particularly suitable for the production of high-quality laminate.

In the below description, the description of the machine-direction-oriented polyethylene (MDO-PE) film is true whether the MDO-PE film is the first or the second film unless explicitly stated otherwise.

In each of the one or more layers comprising polyethylene of the machine-direction-oriented polyethylene film and/or the bi-directionally oriented film; the polyethylene may be selected from a homopolymer, a copolymer of ethylene and one or more comonomers, or a mixture thereof.

In an embodiment, the machine-direction-oriented polyethylene film and/or the bi-directionally oriented film comprises one or more layers comprising or made of linear low-density polyethylene (LLDPE). For example, the machine-direction-oriented polyethylene film and/or the bi-directionally oriented film comprises one or more layers comprising an LLDPE, wherein the LLDPE:

is a copolymer of ethylene and one or more comonomers; and/or has a density of at least 0.910 g/cm$^3$ as determined according to ISO 1183-1:2012 at 23° C.; and/or has a melt index ranging from 0.1 to 5.0 g/10 min as determined according to ISO 1133-2005 at 190° C. under a load of 2.16 kg.

With preference, the bi-directionally oriented film comprises one or more layers comprising an LLDPE wherein said LLDPE has a density of at least 0.926 g/cm$^3$ as determined according to ISO 1183-1:2012 at 23° C.

Suitable comonomers comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. With preference, the one or more comonomers are selected from propylene, 1-butene, 1-hexene, and 1-octene. With preference, the one or more comonomers are selected from propylene, 1-butene, and 1-hexene. More preferably the comonomer is 1-butene and/or 1-hexene.

The term “copolymer” refers to a polymer that is made by linking ethylene and at least one comonomer in the same polymer chain. The term homopolymer refers to a polymer that is made in the absence of comonomer or with less than 0.1 wt. %, more preferably less than 0.05 wt. % of comonomer.

In case the polyethylene is a copolymer, it comprises at least 0.1 wt. % of comonomer, preferably at least 1 wt. %. The ethylene copolymer comprises up to 10 wt. % of comonomer and most preferably up to 6 wt. %.

For example, the LLDPE is a copolymer of ethylene and one or more comonomers selected from propylene, 1-butene, 1-hexene, and 1-octene. For example, the LLDPE is a copolymer of ethylene and 1-hexene.

In an embodiment, the machine-direction-oriented polyethylene film comprises one or more layers comprising a polyethylene having a density of at least 0.910 g/cm$^3$ as determined according to ISO 1183-1:2012 at 23° C.; preferably at least 0.912 g/cm$^3$ or at least 0.915 g/cm$^3$; preferably at least 0.918 g/cm$^3$ or at least 0.920 g/cm$^3$; preferably at least 0.922 g/cm$^3$; preferably at least 0.925 g/cm$^3$ or at least 0.926 g/cm$^3$ more preferably at least 0.928 g/cm$^3$; and most preferably at least 0.930 g/cm$^3$.

In an embodiment, the machine-direction-oriented polyethylene film comprises one or more layers comprising a polyethylene having a density of at least 0.930 g/cm$^3$ as determined according to ISO 1183-1:2012 at 23° C.; preferably at least 0.935 g/cm$^3$; more preferably at least 0.938 g/cm$^3$; and most preferably at least 0.940 g/cm$^3$.

Examples of suitable polyethylene are commercially available at TotalEnergies upon the commercial name Lumicene® M5510 EP, Lumicene® M4707EP, Lumicene® M6012EP, Lumicene® Supertough 32ST05 and Lumicene® Supertough 40ST05.

In an embodiment, the LLDPE has a melt index ranging from 0.1 to 5.0 g/10 min as determined according to ISO 1133-2005 at 190° C. under a load of 2.16 kg; preferably from 0.1 to 4.0 g/10 min or from 0.1 to 3.0 g/10 min or from 0.2 to 2.5 g/10 min; more preferably from 0.3 to 2.0 g/10 min, even more preferably from 0.4 to 1.8 g/10 min, most preferably from 0.5 to 1.6 g/10 min, and even most preferably from 0.2 to 1.5 g/10 min.

For example, the machine-direction-oriented polyethylene film and/or the bi-directionally oriented film comprises one or more layers comprising an LLDPE, wherein the LLDPE:

is a copolymer of ethylene and 1-hexene; and/or has a density of at least 0.910 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

In an embodiment, the machine-direction-oriented polyethylene film and/or the bi-directionally oriented film comprises one or more layers comprising or made of high-density polyethylene (HDPE). For example, the machine-direction-oriented polyethylene film and/or the bi-directionally oriented film comprises one or more layers comprising an HDPE, wherein the HDPE:

is selected from a homopolymer of ethylene, a copolymer of ethylene and one or more comonomers, and any mixture thereof; and/or has a density of at least 0.940 g/cm$^3$ as determined according to ISO 1183-1:2012 at 23° C.; and/or has a melt index ranging from 0.1 to 5.0 g/10 min as determined according to ISO 1133-2005 at 190° C. under a load of 2.16 kg.

For example, the HDPE is or comprises a copolymer of ethylene and one or more comonomers selected from propylene, 1-butene, 1-hexene, and 1-octene. For example, the HDPE is or comprises a copolymer of ethylene and 1-hexene.

For example, the HDPE has a density of at least 0.940 g/cm$^3$ as determined according to ISO 1183-1:2012 at 23° C.; preferably at least 0.945 g/cm$^3$; more preferably at least 0.948 g/cm$^3$; most preferably at least 0.950 g/cm$^3$ and even most preferably at least 0.952 g/cm$^3$.

For example, the HDPE has a density of at most 0.970 g/cm$^3$ as determined according to ISO 1183-1:2012 at 23° C.; preferably at most 0.965 g/cm$^3$, more preferably at most 0.963 g/cm$^3$.

Examples of suitable HDPE are commercially available at TotalEnergies under the commercial name Lumicene® M4707EP, Lumicene® M6012EP or Lumicene® M5510EP.

In an embodiment, the HDPE has a bimodal or multimodal molecular weight distribution and/or is a homopolymer of ethylene. For example, the machine-direction-oriented polyethylene film and/or the bi-directionally oriented film comprises one or more layers comprising an HDPE that is a homopolymer having a bimodal molecular weight distribution.

In an embodiment, the machine-direction-oriented polyethylene film and/or the bi-directionally oriented film comprises one or more layers comprising an HDPE that is a homopolymer having a monomodal molecular weight distribution.

For example, the HDPE has a melt index ranging from 0.1 to 5.0 g/10 min as determined according to ISO 1133-2005 at 190° C. under a load of 2.16 kg; preferably from 0.1 to 4.0 g/10 min; more preferably from 0.1 to 3.0 g/10 min; even more preferably from 0.2 to 2.5 g/10 min; most preferably from 0.3 to 2.0 g/10 min and even most preferably from 0.4 to 1.8 g/10 min or from 0.5 to 1.5 g/10 min or from 0.2 to 1.2 g/10 min.

For example, the machine-direction-oriented polyethylene film being the first film comprises at least one layer comprising a high-density polyethylene (HDPE); with preference, the high-density polyethylene is a homopolymer of ethylene; and/or has a density of at least 0.940 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

For example, the machine-direction-oriented polyethylene film and/or the biaxially-oriented polyethylene film being the second film comprise at least one layer comprising a high-density polyethylene (HDPE); with preference, the high-density polyethylene is a homopolymer of ethylene; and/or has a density of at least 0.948 g/cm$^3$ as determined according to ISO 1183-1:2012 at 23° C.; and/or has a melt index ranging from 0.1 to 3.0 g/10 min as determined according to ISO 1133-2005 at 190° C. under a load of 2.16 kg.

The polyethylene used in the one or more layers of the machine-direction-oriented polyethylene film and/or of the bi-directionally oriented film can be produced using a chromium catalyst, a Ziegler-Natta catalyst or a metallocene catalyst. In an embodiment, the at least one layer of the machine-direction-oriented polyethylene film and/or of the bi-directionally oriented film comprises a metallocene-catalyzed polyethylene.

For example, the machine-direction-oriented polyethylene film comprises from 80 wt. % to 100 wt. % of metallocene-catalysed polyethylene based on the total weight of the machine-direction-oriented polyethylene film; preferably from 85 to 95 wt. % or from 90 to 100 wt. %.

For example, the bi-directionally oriented film comprises from 80 wt. % to 100 wt. % of metallocene-catalysed polyethylene based on the total weight of the machine-direction-oriented polyethylene film, preferably from 85 to 95 wt. % or from 90 to 100 wt. %.

For example, the bi-directionally oriented film comprises from 80 wt. % to 100 wt. % of Ziegler-Natta catalysed polyethylene based on the total weight of the machine-direction-oriented polyethylene film, preferably from 85 to 95 wt. % or from 90 to 100 wt. %.

In an embodiment, the machine-direction-oriented polyethylene film and/or the bi-directionally oriented film comprises one or more layers made of a material that is different from polyethylene to provide complementary properties. In the context of the disclosure, such a layer made of a material that is different from polyethylene is called a complementary layer. Preferably, the machine-direction-oriented polyethylene film and/or the bi-directionally oriented film comprises at least one layer being a complementary layer and made of a polymer selected from the group comprising polypropylene, ethylene vinyl acetate (EVA), plastomers, elastomers, ethylene vinyl alcohol (EVOH), polyesters, fluoropolymers (for example polymers of vinylidene fluoride ($H_2C{=}CF_2$) and/or copolymers of vinylidene fluoride and hexafluoropropylene ($F_2C{=}CF{-}CF_3$)), polyamides, poly(lactic acid), polystyrene, and any mixture thereof.

Preferably, the machine-direction-oriented polyethylene film and/or the bi-directionally oriented film comprises at least one layer being a complementary layer and made of a polymer selected from the group comprising ethylene vinyl acetate (EVA), plastomers, elastomers, ethylene vinyl alcohol (EVOH), polymers of vinylidene fluoride, copolymers of vinylidene fluoride, poly(lactic acid), polyamides, and any mixture thereof.

More preferably, the machine-direction-oriented polyethylene film and/or the bi-directionally oriented film comprises at least one layer being a complementary layer and made of a polymer selected from the group comprising ethylene vinyl acetate (EVA), ethylene vinyl alcohol (EVOH), polymers of vinylidene fluoride, copolymers of vinylidene fluoride and hexafluoropropylene, poly(lactic acid), and any mixture thereof.

In a preferred embodiment, at least one complementary layer is an ethylene-vinyl alcohol copolymer layer. Ethylene-vinyl alcohol copolymer (EVOH) and its derivatives are employed as a barrier to oxygen. It should be understood by those with skill in the art that more than one layer of EVOH may be employed to further lower the oxygen transmission rate of the multilayer film. An example of ethylene-vinyl alcohol copolymer that can be used is available at Mitsubishi Chemical under the commercial name Soarnol™. In the context of the disclosure, plastomers are ethylene copolymers having a density ranging from 0.900 to below 0.910 g/cm$^3$ as determined according to ISO 1183-1:2012 at 23° C.

In the context of the disclosure, the elastomers are one or more selected from elastomeric copolymers of ethylene with 1-octene, elastomeric copolymers of ethylene with 1-butene, elastomeric copolymers of ethylene with propene, and any mixture thereof; and/or from SIS (Styrene isoprene styrene block copolymers), SEPS (Hydrogenated Styrene isoprene styrene block copolymers), SBS (Styrene butadiene styrene block copolymers), SEBS (Hydrogenated styrenic butadiene copolymers), SBSS (Styrene butadiene styrene styrene block copolymers), and any mixture thereof.

Non-exhaustive specific examples of elastomers that can be used are:

a) an ethylene-butene-1 random copolymer rubber such as:
   - ENGAGE 7642 produced by The Dow Chemical Co. Ltd., having an MI2 of 0.5 g/10 min.
   - ENGAGE 7447 produced by The Dow Chemical Co. Ltd., having an MI2 of 5.0 g/10 min.
   - ENGAGE 7467 produced by The Dow Chemical Co. Ltd., having an MI2 of 1.2 g/10 min.
   - Tafmer A0550S from Mitsui having an MI2 of 0.5 g/10 min.
   - Tafmer A1550S from Mitsui having an MI2 of 1.0 g/10 min.
   - Lucene 168 from LG having an MI2 of 1.2 g/10 min.
   - Lucene 175 from LG having an MI2 of 1.2 g/10 min.
   - Lucene 565 from LG having an MI2 of 1.2 g/10 min.

b) an ethylene-octene-1 random copolymer rubber such as:
   - Affinity EG8100 from The Dow Chemical Co. Ltd., having an MI2 of 1.0 g/10 min.
   - Affinity EG8150 from The Dow Chemical Co. Ltd., having an MI2 of 0.5 g/10 min.

c) an ethylene propylene copolymer rubber such as Exxon IT0316 from ExxonMobil, having an ethylene content of 16 wt. %.

It is desirable that the laminate comprises a low fraction of material that is different from polyethylene; for example, the material that is different from polyethylene at a content of at most 20 wt. % based on the total weight of the laminate; preferably, at most 15 wt. %; more preferably, at most 10 wt. %; even more preferably, at most 5 wt. %; and most preferably, at most 3 wt. % or at most 2 wt. % or at most 1 wt. %.

For example, the machine-direction-oriented polyethylene film and/or the bi-directionally oriented film comprises at least one complementary layer having a first surface and a second surface, a first tie-layer adhesive bonded to the first surface and a second tie-layer adhesive bonded to the second surface of the complementary layer; with preference, the first tie layer and/or the second tie-layer comprise maleic anhydride grafted polyethylene. An example of maleic anhydride grafted polyethylene that can be used is available at Arkema under the commercial name Orevac.

In a preferred embodiment, wherein barrier properties are desirables, the machine-direction-oriented polyethylene film and/or the bi-directionally oriented film comprises at least one ethylene-vinyl alcohol copolymer (EVOH) layer having a first surface and a second surface, a first tie-layer adhesive bonded to the first surface and a second tie-layer adhesive bonded to the second surface of the ethylene-vinyl alcohol copolymer layer; with preference, the tie layers comprise maleic anhydride grafted polyethylene.

The First Film being a Machine-Direction-Oriented Polyethylene Film (MDO-PE)

In the context of the present disclosure, a machine-direction-oriented (MDO) film is to be understood to be a film that is formed by blown extrusion or by cast extrusion and subjected to an orientation in the machine direction of the film production line at a temperature below the melting temperature of the material of the film.

For example, the MDO-PE film comprises one or more layers comprising polyethylene, when at least two layers comprise polyethylene, the polyethylene used in such layers can be the same or different. For example, the polyethylene of two adjacent layers may differ by their respective density and/or their melt index.

In each of the polyethylene layers of the MDO-PE film; the polyethylene is selected from linear low-density polyethylene (LLDPE), low-density polyethylene (LDPE), medium density polyethylene (MDPE), high-density polyethylene (HDPE), and mixtures thereof.

In an embodiment, the machine-direction-oriented polyethylene film comprises two skin layers comprising polyethylene wherein the polyethylene of at least one skin layer has a density of at least 0.940 g/cm$^3$ as determined according to ISO 1183-1:2012 at 23° C.; preferably at least 0.945 g/cm$^3$; more preferably at least 0.948 g/cm$^3$; most preferably at least 0.950 g/cm$^3$ and even most preferably at least 0.952 g/cm$^3$.

For example, the machine-direction-oriented polyethylene film comprises two skin layers comprising polyethylene wherein the polyethylene of at least one skin layer has a density of at most 0.970 g/cm$^3$ as determined according to ISO 1183-1:2012 at 23° C.; preferably at most 0.965 g/cm$^3$, more preferably at most 0.963 g/cm$^3$.

For example, the machine-direction-oriented polyethylene film comprises two skin layers comprising polyethylene wherein the polyethylene of at least one skin layer is or comprises high-density polyethylene (HDPE).

In an embodiment, the machine-direction-oriented polyethylene film comprises two skin layers comprising polyethylene wherein the polyethylene of at least one skin layer has a density greater than the polyethylene of one or more inner layers selected from an intermediate layer or a core layer.

For example, machine-direction-oriented polyethylene film comprises at least three layers; including a core layer and two skin layers comprising polyethylene and the two skin layers comprise a polyethylene having a density greater than the polyethylene of the core layer.

For example, the machine-direction-oriented polyethylene film comprises at least five layers; including two skin layers comprising polyethylene and two intermediate layers and the two skin layers comprise a polyethylene having a density greater than the polyethylene of the two intermediate layers.

In an embodiment, the machine-direction-oriented polyethylene film comprises one or more layers comprising linear low-density polyethylene (LLDPE) that has a density of at least 0.925 g/cm$^3$, or at least 0.926 g/cm$^3$ as determined according to ISO 1183-1:2012 at 23° C. preferably at least 0.928 g/cm$^3$; and most preferably at least 0.930 g/cm$^3$. For example, when machine-direction-oriented polyethylene film has at least two layers comprising linear low-density polyethylene (LLDPE), a first layer may comprise linear low-density polyethylene (LLDPE) that has a density of at least 0.925 g/cm$^3$ or at least 0.926 g/cm$^3$ as determined according to ISO 1183-1:2012 at 23° C.; and a second layer may comprise linear low-density polyethylene (LLDPE) that has a density of at least 0.935 g/cm$^3$ as determined according to ISO 1183-1:2012 at 23° C.

According to the present disclosure, the MDO-PE film is a multi-layered film comprising at least 3 layers; preferably at least 5 layers, more preferably at least 7 layers and even more preferably at least 9 layers. For example, the MDO-PE film is a multi-layered film comprising 3 layers; preferably 4 layers, more preferably 5 layers, even more preferably 7 layers; and even more preferably 9 layers.

The MDO-PE film can be a multi-layered film with a symmetric structure or an asymmetric structure.

In an embodiment, the MDO-PE film is a multi-layered film with a symmetric structure. For example, the MDO-PE film is a multi-layered film comprising 3 layers being HDPE/LLDPE/HDPE. For example, the MDO-PE film is a multi-layered film comprising 5 layers being HDPE/LLDPE/LLDPE/LLDPE/HDPE; or HDPE/tie layer/complementary layer/tie layer/HDPE. For example, the MDO-PE film is a multi-layered film comprising 7 layers being HDPE/LLDPE/HDPE/LLDPE/HDPE/LLDPE/HDPE; or HDPE/LLDPE/tie layer/complementary layer/tie layer/LLDPE/HDPE. For example, the MDO-PE film is a multi-layered film comprising 9 layers being HDPE/LLDPE/LLDPE/tie layer/complementary layer/tie layer/LLDPE/LLDPE/HDPE.

In an embodiment, the MDO-PE film is a multi-layered film with an asymmetric structure. For example, the MDO-PE film is a multi-layered film comprising 3 layers being HDPE/HDPE/LLDPE; or HDPE/LLDPE/LLDPE; or HDPE/LLDPE/plastomer. For example, the MDO-PE film is a multi-layered film comprising 5 layers being HDPE/LLDPE/HDPE/LLDPE/LLDPE.

The above lists of symmetric or asymmetric structures are not exhaustive.

In an embodiment, the machine-direction-oriented polyethylene film has a thickness of at most 70 μm as determined by DIN ISO 4593; preferably, at most 60 μm; more preferably, at most 50 μm; even more preferably, at most 40 μm; most preferably, at most 35 μm; and even most preferably, at most 30 μm.

For example, the machine-direction-oriented polyethylene film comprises polyethylene at a content of at least 80 wt. % based on the total weight of the machine-direction-oriented polyethylene film; preferably, at least 85 wt. %; more preferably, at least 90 wt. %; even more preferably, at least 95 wt. %; and most preferably, at least 97 wt. %.

The Second Film being a Biaxially-Oriented Polyethylene (BOPE) Film or being a Machine-Direction-Oriented Polyethylene (MDO-PE) Film.

In the context of the present disclosure, a bi-directionally oriented film is to be understood to be a film that is formed by cast extrusion and subjected to orientation in the machine direction and the transverse direction of the film production line, at a temperature below the melting temperature of the material of the film.

When used as the second film, the machine-direction-oriented polyethylene (MDO-PE) film is a blown film.

According to the disclosure, the second film being an MDO-PE film or a BOPE film is selected from a monolayered film or a multi-layered film comprising at least two layers; preferably at least three layers. When the second film being an MDO-PE film or a BOPE film is monolayered, the single layer is preferably made of or comprises linear low-density polyethylene (LLDPE).

In an embodiment, the second film is monolayered and comprises a high-density polyethylene (HDPE) having a density of at least 0.945 $g/cm^3$ as determined according to ISO 1183-1:2012 at 23° C. In such an embodiment, wherein the second film is monolayered, the second film comprise a blend of LLDPE and HDPE wherein the linear low-density polyethylene is present in the blend at a content ranging from 60 to 99.9 wt. % based on the total weight of the blend; with preference ranging from 70 to 95 wt. % or from 75 to 90 wt. %.

In an embodiment, the second film is multi-layered and comprise comprises at least one layer comprising a high-density polyethylene (HDPE). The HDPE layer is preferably a core layer and/or an intermediate layer.

For example, the second film is multi-layered and comprises at least one layer comprising a high-density polyethylene wherein the HDPE-containing layer is a core layer and/or an intermediate layer; and the HDPE-containing layer comprises from 60 to 100 wt. %. of HDPE based on the total weight of the layer, with preference ranging from 70 to 95 wt. % or from 75 to 90 wt. %.

For example, the second film is multi-layered and comprise comprises at least one layer comprising a high-density polyethylene wherein the HDPE-containing layer is a core layer and/or an intermediate layer; wherein the HDPE has a density of at least 0.945 $g/cm^3$ as determined according to ISO 1183-1:2012 at 23° C.; preferably at least 0.946 $g/cm^3$; more preferably at least 0.948 $g/cm^3$; most preferably at least 0.950 $g/cm^3$ and even most preferably at least 0.952 $g/cm^3$.

the second film is multi-layered and comprise comprises at least one layer comprising a high-density polyethylene wherein the HDPE-containing layer is a core layer and/or an intermediate layer; wherein the HDPE has a density of at most 0.970 $g/cm^3$ as determined according to ISO 1183-1:2012 at 23° C.; preferably at most 0.965 $g/cm^3$, more preferably at most 0.963 $g/cm^3$.

In an embodiment, the second film being a machine-direction-oriented polyethylene film or a biaxially-oriented polyethylene film comprises one or more layers comprising a linear low-density polyethylene (LLDPE) having a density of at least 0.910 $g/cm^3$ as determined according to ISO 1183-1:2012 at 23° C.; preferably at least 0.911 $g/cm^3$ or at least 0.912 $g/cm^3$; preferably at least 0.913 $g/cm^3$ or at least 0.914 $g/cm^3$; preferably at least 0.915 $g/cm^3$ or at least 0.916 $g/cm^3$.

For example, the second film being a machine-direction-oriented polyethylene film or a biaxially-oriented polyethylene film comprises one or more layers comprising a linear low-density polyethylene (LLDPE) having a density of at most 0.935 $g/cm^3$ as determined according to ISO 1183-1:2012 at 23° C.; preferably at most 0.930 $g/cm^3$; more preferably at most 0.928 $g/cm^3$; and most preferably at most 0.925 $g/cm^3$ or at most 0.923 $g/cm^3$; or at most 0.920 $g/cm^3$.

For example, the second film being a machine-direction-oriented polyethylene film or a biaxially-oriented polyethylene film comprises two skin layers comprising polyethylene wherein the polyethylene of at least one skin layer is or comprises linear low-density polyethylene (LLDPE).

In an embodiment, the second film comprises at least one layer being a single layer or a skin layer and comprising a blend of linear low-density polyethylene and high-density polyethylene.

In an embodiment, the second film comprises at least one layer being a single layer or a skin layer and comprising a blend of linear low-density polyethylene and high-density polyethylene; wherein the linear low-density polyethylene is present in the blend at a content ranging from 60 to 99.9 wt. % based on the total weight of the blend; with preference ranging from 70 to 95 wt. % or from 75 to 90 wt. %.

In an embodiment, the second film comprises at least one layer being a single layer or a skin layer and comprising a blend of linear low-density polyethylene and high-density polyethylene; wherein the content of high-density polyethylene is from 0.1 to 40 wt. % based on the total weight of the blend; with preference ranging from 5 to 30 wt. % or from 10 to 25 wt. %. For example, the HDPE is present in the blend at a content of at least 10 wt. % based on the total weight of the blend; preferably at least 15 wt. %; more preferably at least 18 wt. % and more preferably at least 20 wt. %.

In an embodiment, the second film comprises at least one layer being a single layer or a skin layer and comprising a blend of linear low-density polyethylene and high-density polyethylene; wherein the HDPE has a density of at least 0.945 $g/cm^3$ as determined according to ISO 1183-1:2012 at 23° C.; preferably at least 0.946 $g/cm^3$; more preferably at least 0.948 $g/cm^3$; most preferably at least 0.950 $g/cm^3$ and even most preferably at least 0.952 $g/cm^3$. In an embodiment, the second film comprises at least one layer being a single layer or a skin layer and comprising a blend of linear low-density polyethylene and high-density polyethylene; wherein the HDPE has a density of at most 0.970 $g/cm^3$ as determined according to ISO 1183-1:2012 at 23° C.; preferably at most 0.965 $g/cm^3$, more preferably at most 0.963 $g/cm^3$.

For example, the single layer or at least one layer being a skin layer comprises a blend of linear low-density polyethylene and high-density polyethylene; wherein the linear low-density polyethylene has a density ranging from 0.910 $g/cm^3$ to 0.935 $g/cm^3$ as determined according to ISO 1183-1:2012 at 23° C.; preferably 0.910 $g/cm^3$ to 0.920 $g/cm^3$; and the high-density polyethylene has a density ranging from 0.945 $g/cm^3$ to 0.970 $g/cm^3$ as determined according to ISO 1183-1:2012 at 23° C.; preferably 0.950 $g/cm^3$ to 0.962 $g/cm^3$.

In an embodiment, the second film comprises at least one layer being a skin layer and comprising a blend of linear low-density polyethylene and high-density polyethylene wherein the blend has a density of at least 0.920 $g/cm^3$ as determined according to ISO 1183-1:2012 at 23° C.; preferably at least 0.922 $g/cm^3$; preferably at least 0.925 $g/cm^3$ or at least 0.926 $g/cm^3$ more preferably at least 0.928 $g/cm^3$; and most preferably at least 0.930 $g/cm^3$.

For example, the second film comprises at least one layer being a skin layer and comprising a blend of linear low-density polyethylene and high-density polyethylene wherein the blend has a density of at most 0.945 g/cm$^3$ as determined according to ISO 1183-1:2012 at 23° C.; preferably at most 0.942 g/cm$^3$; preferably at most 0.940 g/cm$^3$.

In an embodiment, the second film being a machine-direction-oriented polyethylene film or a biaxially-oriented polyethylene film comprises two skin layers comprising polyethylene wherein the polyethylene of at least one skin layer has a density lower than the polyethylene of one or more inner layers selected from an intermediate layer or a core layer.

For example, second film being a machine-direction-oriented polyethylene film or a biaxially-oriented polyethylene film comprises at least three layers; including a core layer and two skin layers comprising polyethylene and the two skin layers comprise a polyethylene having a density lower than the polyethylene of the core layer.

For example, the second film being a machine-direction-oriented polyethylene film or a biaxially-oriented polyethylene film comprises at least five layers; including two skin layers comprising polyethylene and two intermediate layers and the two skin layers comprise a polyethylene having a density lower than the polyethylene of the two intermediate layers.

The second film being an MDO-PE film or a BOPE film can be a multi-layered film with a symmetric structure or an asymmetric structure.

In an embodiment, the second film is a multi-layered film with a symmetric structure.

For example, the second film is a multi-layered film comprising 3 layers being LLDPE/HDPE/LLDPE. For example, the second film is a multi-layered film comprising 5 layers being LLDPE/LLDPE/HDPE/LLDPE/LLDPE; or LLDPE/tie layer/complementary layer/tie layer/LLDPE. For example, the second film is a multi-layered film comprising 7 layers being LLDPE/HDPE/LLDPE/HDPE/LLDPE/HDPE/LLDPE; or LLDPE/HDPE/tie layer/complementary layer/tie layer/HDPE/LLDPE. For example, the second film is a multi-layered film comprising 9 layers being LLDPE/LLDPE/HDPE/tie layer/complementary layer/tie layer/HDPE/LLDPE/LLDPE.

In an embodiment, the second film is a multi-layered film with an asymmetric structure. For example, the BOPE film is a multi-layered film comprising 3 layers being HDPE/HDPE/LLDPE;

or HDPE/LLDPE/LLDPE. For example, the second film is a multi-layered film comprising 5 layers being HDPE/LLDPE/HDPE/LLDPE/LLDPE.

The above lists of symmetric or asymmetric structures are not exhaustive. In an embodiment, the biaxially-oriented polyethylene film has a thickness of at most 60 μm as determined by DIN ISO 4593; preferably, at most 40 μm; more preferably, at most 35 μm; even more preferably, at most 30 μm; most preferably, at most 25 μm; and even most preferably, at most 20 μm.

In an embodiment, the second film being a machine-direction-oriented polyethylene film or a biaxially-oriented polyethylene film comprises at least three layers including the two skin layers and at least one inner layer selected from a core layer and an intermediate layer; wherein at least one inner layer comprises a high-density polyethylene: with preference, the high-density polyethylene is a recycled material selected from a post-consumer resin (PCR), a post-industrial resin (PIR), and a mixture thereof.

For example, the second film being a machine-direction-oriented polyethylene film or a biaxially-oriented polyethylene film comprises polyethylene at a content of at least 80 wt. % based on the total weight of the second film; preferably, at least 85 wt. %; more preferably, at least 90 wt. %; even more preferably, at least 95 wt. %; and most preferably, at least 97 wt. %.

The one or more polyethylene resins used in the first and/or the second film may be compounded with one or more additives, in particular additives such as, by way of example, processing aids, mold-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastisizers, colorants/pigments/dyes, sealant resins and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mold-release agents such as calcium stearate, zinc stearate, SHT, antioxidants such as Irgafos® 168, Irganox®1010, and Irganox®1076, anti-slip agents such as erucamide, light stabilizers such as Tinuvin®622, Tinuvin®326 and Cyasorb THT®4611, ionomers, and nucleating agents such as Milliken HPN20E™.

The second film is a biaxially-oriented polyethylene (BOPE) film or a machine-direction-oriented polyethylene (MDO-PE) film; and is selected from a monolayered film or a multi-layered film comprising at least two layers, and comprises at least a sealing layer. Therefore, the second film has a sealing initiation temperature (SIT) equal to or lower than 128° C. as determined by the method described in the description hereafter; preferably, equal to or lower than 126° C.; more preferably, equal to or lower than 125° C.; even more preferably, equal to or lower than 123° C.; most preferably, equal to or lower than 120° C.; and even most preferably, equal to or lower than 118° C. or equal to or lower than 115° C.

Test Methods

The melt flow index MI2 of the polyethylene resin is determined according to ISO 1133-2005 at 190° C. under a load of 2.16 kg.

The HLMI of the polyethylene resin is determined according to ISO 1133-2005 at 190° C. under a load of 21.6 kg.

The Mn, Mw, Mz, Mw/Mn and Mz/Mw: The molecular weight ($M_n$ (number average molecular weight), $M_w$ (weight average molecular weight) and molecular weight distributions D (Mw/Mn) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806 MS (Showa Denko) and one Styragel HT6E (Waters) columns were used with a flow rate of 1 ml/min. Detector: Infrared detector (2800-3000 cm-1). Calibration: narrow standards of polystyrene (PS) (commercially available). Calculation of molecular weight Mi of each fraction i of eluted polyethylene is based on the Mark-Houwink relation (log 10 (MPE) $=0.965909\times\log_{10}$ (Mps)$-0.28264$) (cut off on the low molecular weight end at MPE=1000).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well-known to the skilled person and include, for example, sufficient relaxation time etc. In practice, the intensity of a signal is obtained from its integral, i.e., the corresponding area. The data are acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as an internal standard. To give an example, about 200 mg to 600 mg of polymer is dissolved in 2.0 mL of TCB, followed by the addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content in polyethylene is determined by 13C-NMR analysis of pellets according to the method described by G. J. Ray et al. (Macromolecules, 1977, 10, (4), 773-778).

Crystallisation temperature (Tc) and Melting temperature (Tm) are determined according to ISO 11357-3:2018 on a DSC Q2000 instrument by TA Instruments. To erase the thermal history the samples are first heated to 220° C. and kept at 220° C. for 3 minutes. Then the polymer is cooled at −20° C./min. up to 20° C. and kept at 20° C. for 3 minutes. The crystallization temperature is determined during this cooling step. The crystallization temperature Tc corresponds to the temperature of the extremum of the spectrogram presenting the heat flux associated with the polymer as a function of the temperature during its cooling. The polymer is then melted up to 220° C. at 20° C./min. and the melting temperature is determined during this heating step. The melting temperature corresponds to the temperature of the extremum of the spectrogram presenting the heat flux associated with the polymer as a function of the temperature during its melting.

The density was measured according to the method of standard ISO 1183-1:2012 (immersion method) at a temperature of 23° C.

Thickness of the films was determined according to DIN ISO 4593.

Mechanical properties of the films were determined according to ASTM D 882.

The sealing initiation temperature (SIT) was determined as followed: the samples are 150 mm×100 mm are cut from the original films. After 40 hours of conditioning at 23° C. (humidity 50%), a Brugger HSG-C 951 apparatus was used to make the seals using a 150×10 mm seal beam, a seal bar pressure of 300 N bar and a dwell time of 3 seconds. Once the seal is realised, specimens of 15 mm length and 100 mm long are cut within the samples. After 24 hours of conditioning at 23° C. (humidity 50%), the seal strength was determined using a Zwick Z 2.5/TH1S tensile tester. The clamp distance was 10 mm and the clamp speed was 200 mm/min. The SIT is the temperature at which a seal strength max of 5N is obtained.

EXAMPLES

The following non-limiting examples illustrate the disclosure.

Selection of the Materials

- LLDPE1 was prepared according to the process disclosed in WO2020078932 for the inventive examples. LLDPE1 is metallocene-catalyzed. The comonomer is hexene and is present at about 8 wt. %
- LLDPE2 is Lumicene® Supertough 32ST05 is commercially available from TotalEnergies
- HDPE1 is Lumicene® M5510EP (batch S106319328), commercially available at TotalEnergies
- HDPE2 is HD6207CC (batch H008E00380), commercially available at TotalEnergies
- HDPE3 is an experimental resin and is Ziegler-Natta catalyzed
- HDPE4 is an experimental resin and is Ziegler-Natta catalyzed
- HDPE5 is Lumicene® Supertough 40ST05 commercially available from TotalEnergies The properties of the material used in the films are provided in the below table 1

TABLE 1

| | MI2 | Density | Mz | Mw | |
|---|---|---|---|---|---|
| | unit | | | | |
| Resin | g/10 min | g/cm$^3$ | g/mol | g/mol | Mw/Mn |
| LLDPE1 | 1.62 | 0.916 | 243,734 | 85,620 | 4.5 |
| LLDPE2 | 0.5 | 0.931 | | | |
| HDPE1 | 1.22 | 0.957 | 141,299 | 76,880 | 2.7 |
| HDPE2 | 0.69 | 0.962 | 706,958 | 126,362 | 5.8 |
| HDPE3 | 0.8 | 0.958 | 958,644 | 135,310 | 10.1 |
| HDPE4 | 0.83 | 0.954 | 848,033 | 126,241 | 9.6 |
| HDPE5 | 0.5 | 0.940 | | | |

Blends of LLDPE and HDPE have also been used and are described in table 2

TABLE 2

| Blend | LLDPE | HDPE | Ratio (LLDPE/HDPE) | MI2 g/10 min | Density g/cm³ |
|---|---|---|---|---|---|
| BLEND01 | LLDPE1 | HDPE1 | 80/20 | 1.38 | 0.925 |
| BLEND02 | LLDPE1 | HDPE2 | 80/20 | 1.27 | 0.926 |

BLEND01 and BLEND02 blends were extruded/compounded prior to the BOPE pilot trials to ensure an optimum homogeneity of the mixture

TABLE 3

| blend unit | Tm (° C.) (1) ° C. | Mw g/mol | Mz g/mol | Mw/Mn | Mz/Mw | Comonomer content wt % |
|---|---|---|---|---|---|---|
| BLEND01 | 124.1 | 84,230 | 207,604 | 3.9 | 2.5 | 7.3 |
| BLEND02 | 125.1 | 91,683 | 288,536 | 4.5 | 3.1 | 7.3 |

The following laminates and films have been tested

Film 1 (comparative) laminate of film PET (thickness: 12 μm)+film PE-EVOH—final thickness 56 μm Film 2: (comparative) laminate of film PET (thickness: 12 μm)+film PE-LDPE (thickness: 80 μm)—final thickness 94 μm Film 3: (comparative) laminate of film BOPE (thickness: 20 μm)+film PE-LDPE-EVOH (thickness: 65 μm)—final thickness 92 μm Film 4: (comparative) laminate of film DPA (thickness: 15 μm)+film PE (thickness: 30 μm)—final thickness 46 μm Film 5: (inventive) laminate of MDO-PE blown film (multi-layered-thickness: 25 μm)+film BOPE (multi-layered)—final thickness 45 μm Film 6: (inventive) laminate of MDO-PE blown film (multi-layered-thickness: 25 μm)+film BOPE (mono-layered)—final thickness 44 μm Film 7: (comparative) laminate of MDO-PE blown film (multi-layered-thickness: 25 μm)+film blown MDO-PE (multi-layered)—final thickness 55 μm Film 8: (inventive) laminate of (MDO-PE+EVOH) blown film (multi-layered-thickness: 25 μm)+film BOPE (multi-layered)—final thickness 48 μm Film 9: (inventive) laminate of (MDO-PE+EVOH) blown film (multi-layered-thickness: 25 μm)+film BOPE (multi-layered)—final thickness 48 μm Film 10: (inventive) laminate of MDO-PE cast film (multi-layered-thickness: 30 μm)+film BOPE (multi-layered)—final thickness 52 μm In all examples the final thickness is the thickness of the laminate.

The first film of the inventive examples is selected from a film blown MDO-PE and film cast MDO-PE In the films 5, 6 and 7, the first film is an MDO-PE blown film with a thickness of 25 μm. The film is multi-layered and comprises 5 layers wherein two skin layers are made of HDPE1, two intermediate layers are made of HDPE5 and one core layer is made of LLDPE2 (i.e., HDPE1/HDPE5/LLDPE2/HDPE5/HDPE1).

In the films 8 and 9, the first film is an (MDO-PE+EVOH) blown film of 25 μm. The film is multi-layered and comprises 9 layers wherein two skin layers are made of HDPE1, four intermediate layers are made of LLDPE2, two tie layers are sandwiching the core layer that is made of EVOH (i.e., HDPE1/LLDPE2/LLDPE2/tie layer/EVOH/tie layer/LLDPE2/LLDPE2/HDPE1). The presence of an EVOH layer provide barrier properties.

In the film 10, the first film is an MDO-PE cast film with a thickness of 30 μm. The film is multi-layered and comprises 5 layers wherein two skin layers are made of HDPE1, two intermediate layers are made of HDPE5 and one core layer is made of LLDPE2 (i.e., HDPE1/HDPE5/LLDPE2/HDPE5/HDPE1).

The second film of the inventive examples is selected from a film blown MDO-PE or a BOPE.

In the film 5, the second film is a BOPE multi-layered and comprises 3 layers wherein two skin layers are made of the blend BLEND01 and the core layer is made of HDPE4 (i.e., BLEND01/HDPE4/BLEND01).

In the film 6, the second film is a monolayered BOPE wherein the single layer is made of BLEND02.

In the film 7, the second film is an MDO-PE blown film with a thickness of 25 μm. The film is multi-layered and comprises 5 layers wherein two skin layers are made of HDPE1, two intermediate layers are made of HDPE5 and one core layer is made of LLDPE2 (i.e., HDPE1/HDPE5/LLDPE2/HDPE5/HDPE1).

In the film 8, the second film is a BOPE multi-layered and comprises 3 layers wherein two skin layers are made of the blend BLEND01 and the core layer is made of HDPE1 (i.e., BLEND01/HDPE1/BLEND01)

In the film 9, the second film is a BOPE multi-layered and comprises 3 layers and is asymmetrical wherein one skin layer and the core layer are made of HDPE3, and one skin layer is made of BLEND01 (i.e., HDPE3/HDPE3/BLEND01)

In the film 10, the second film is a BOPE multi-layered and comprises 3 layers wherein two skin layers are made of the blend BLEND01 and the core layer is made of HDPE4 (i.e., BLEND01/HDPE4/BLEND01)

The results of the tests performed are provided in the below tables 3-10. In the tables n.d. is for "not determined".

TABLE 3

| Dart tests - ISO 7765-1/ASTM D1709 - Method A | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| Dart | g | 825 | 942 | 960 | 850 | 506 | 731 | 76 | 370 | 398 | 437 |
| Dart/Thickness | g/μm | 14.7 | 10 | 10.4 | 18.5 | 11.2 | 16.6 | 1.4 | 7.7 | 8.3 | 8.4 |

TABLE 4

| ELMENDORF<br>Elmendorf was determined according to ISO 6383-2: 2004<br>Thickness was determined according to ISO 4593 using the apparatus TESA TT20 | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| Test direction: Machine | | | | | | | | | | | |
| Applied Mass | g | 400 | 400 | 3200 | 400 | 400 | 400 | 400 | 400 | 400 | 400 |
| Average Thickness | mm | 0.056 | 0.094 | 0.092 | 0.046 | 0.045 | 0.044 | 0.055 | 0.048 | 0.048 | 0.052 |
| Tear resistance Avg. MD | N | 0.24 | 0.57 | 1.69 | 0.91 | 0.24 | 0.3 | 0.47 | 0.25 | 0.23 | 0.25 |
| Elmendorf/Thickness | N/mm | 4 | 6 | 18 | 20 | 5 | 7 | 9 | 5 | 5 | 5 |
| Test direction: Transverse | | | | | | | | | | | |
| Applied Mass | g | 400 | 400 | 3200 | 400 | 3200 | 400 | 3200 | 400 | 400 | 400 |
| Average Thickness | mm | 0.056 | 0.094 | 0.092 | 0.046 | 0.045 | 0.044 | 0.055 | 0.048 | 0.048 | 0.052 |
| Tear resistance Avg. TD | N | 0.28 | 0.71 | 1.49 | 0.26 | 3.34 | 0.72 | 8.45 | 0.42 | 0.65 | 0.91 |
| Elmendorf/Thickness | N/mm | 5 | 8 | 16 | 6 | 74 | 16 | 154 | 9 | 13 | 18 |

TABLE 5

| Optical properties<br>Gloss was measured according to ASTM D2457, Measure Direction: transverse<br>Haze was measured according to ISO 14782 on 02-0103<br>Thickness was determined according to ISO 4593 using the apparatus TESA TT20 | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| GLOSS | | | | | | | | | | | |
| Measure transverse Face | | external | external | external | external | internal | internal | internal | external | external | external |
| Gloss @ 45° | | 88 | 85 | 7 | 92 | 53 | 76 | 59 | 54 | 55 | 55 |
| HAZE | | | | | | | | | | | |
| Nominal Thickness | mm | 0.056 | 0.094 | 0.092 | 0.046 | 0.045 | 0.045 | 0.055 | 0.048 | 0.048 | 0.052 |
| Haze_average | % | 11.2 | 14.4 | 66 | 6.6 | 11.1 | 4.7 | 8.5 | 14.9 | 15.4 | 15.4 |

TABLE 6

| Modulus secant<br>Modulus secant was determined according to ASTM D 882 ( | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| Direction: Machine | | | | | | | | | | | |
| Temperature | ° C. | 23 | 23 | 23 | 23 | 23 | 23 | 23 | 23 | 23 | 23 |
| Test speed | mm/min | 25 | 25 | 25 | 25 | 25 | 25 | 25 | 25 | 25 | 25 |
| Average secant modulus 1% MD | MPa | 1512 | 936 | 838 | 1558 | 1117 | 759 | 1011 | 1229 | 1251 | 1099 |
| Strength Secant Modulus @ 1% MD | N | 12.22 | 13.43 | 11.49 | 10.51 | n.d. | n.d. | n.d. | 8.83 | 9.11 | 9.02 |
| Direction: Transverse | | | | | | | | | | | |
| Temperature | ° C. | 23 | 23 | 23 | 23 | 23 | 23 | 23 | 23 | 23 | 23 |
| Test speed | mm/min | 25 | 25 | 25 | 25 | 25 | 25 | 25 | 25 | 25 | 25 |
| Average secant modulus 1% TD | MPa | 1596 | 1104 | 1131 | n.d. | 1462 | 949 | 1400 | 1339 | 1347 | 1343 |
| Strength Secant Modulus @ 1% TD | N | 13.68 | 15.09 | 15.47 | n.d. | n.d. | n.d. | n.d. | 10.19 | 9.69 | 11.21 |

TABLE 7

| Slow puncture<br>Slow puncture was determined according to ASTM D5748 | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| Test speed | mm/min | 250 | 250 | 250 | 250 | 250 | 250 | 250 | 250 | 250 | 250 |
| Punch diam. | inch | 0.75 | 0.75 | 0.75 | 0.75 | 0.75 | 0.75 | 0.75 | 0.75 | 0.75 | 0.75 |
| Temperature | ° C. | 23 | 23 | 23 | 23 | 23 | 23 | 23 | 23 | 23 | 23 |
| Av. strength at break | N | 170.6 | 162.2 | 219.1 | 139.4 | 176.9 | 172.2 | 76.6 | 122.4 | 144.6 | 156.1 |
| Av. elongation at break | mm | 29.9 | 26.4 | 28.9 | 26.1 | 26.8 | 36.3 | 19.5 | 23.3 | 24.8 | 23.7 |
| Avg. Work @ Break | J | 2.15 | 1.83 | 2.46 | 1.48 | 1.67 | 2.52 | 0.56 | 1.06 | 1.32 | 1.3 |
| Avg. Strength @ Break/Thickness | N/mm | 3218 | 1776 | 2371 | 3144 | 3774 | 4145 | 1462 | 2616 | 2778 | 2746 |
| Avg. Work/Thickness | J/mm | 40.6 | 20 | 26.7 | 33.3 | 35.5 | 60.2 | 10.7 | 22.6 | 25.3 | 22.9 |

TABLE 8

| Tensile properties<br>Tensile properties were determined according to ASTM D 882 | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| Temperature | ° C. | 23 | 23 | 23 | 23 | 23 | 23 | 23 | 23 | 23 | 23 |
| Speed test | mm/min | 500 | 500 | 500 | 500 | 500 | 500 | 500 | 500 | 500 | 500 |
| Direction | | Machine | Machine | Machine | Machine | Machine | Machine | Machine | Machine | Machine | Machine |
| Strength Avg. @ Break (MD) | MPa | 56.4 | 37.9 | 40.9 | 73.7 | 143.1 | 120.8 | 135 | 119.7 | 113.9 | 128.4 |
| Elongation Avg. @ Break (MD) | % | 82 | 75 | 110 | 91 | 120 | 112 | 104 | 104 | 94 | 84 |
| Temperature | ° C. | 23 | 23 | 23 | 23 | 23 | 23 | 23 | 23 | 23 | 23 |
| Speed test | mm/min | 500 | 500 | 500 | 500 | 500 | 500 | 500 | 500 | 500 | 500 |
| Direction | | Trans-verse | Trans-verse | Trans-verse | Trans-verse | Trans-verse | Trans-verse | Trans-verse | Trans-verse | Trans-verse | Trans-verse |
| Strength Avg. @ Break (TD) | MPa | 64.3 | 43.7 | 77 | 65.2 | 80 | 61.5 | 16.8 | 51.7 | 53.5 | 57 |
| Elongation Avg. @ Break (TD) | % | 63 | 69 | 34 | 77 | 36 | 101 | 219 | 36 | 38 | 36 |

TABLE 9

| Barrier properties | | | | | | | | | | | |
|---|---|---|---|---|---|---|---|---|---|---|---|
| | | FILM 1 | FILM 2 | FILM 3 | FILM 4 | FILM 5 | FILM 6 | FILM 7 | FILM 8 | FILM 9 | FILM 10 |
| WVTR @ 23° C./ 85% r.H. | $g/(m^2*d)$ | 1.3 | 0.81 | n.d. | 2.6 | 2.6 | 8.5 | 0.91 | 0.92 | 0.97 | 0.96 |
| WVTR @ 38° C./ 90% r.H. | $g/(m^2*d)$ | n.d. | n.d. | n.d. | n.d. | 10.3 | n.d. | n.d. | n.d. | n.d. | n.d. |
| OTR @ 23° C., 0% r/H. | $cm^3/m^2*d*bar)$ | 1.5 | 113 | n.d. | 115 | 4880 | >12500 | n.d. | 2.1 | 2.3 | 1440 |

TABLE 10

| Sealing properties<br>Sealing properties were determined according to ASTM 88<br>Sealing from the internal face (of the coil) to the internal face (of the coil) | | | | |
|---|---|---|---|---|
| | | FILM 1 | FILM 2 | FILM 6 |
| Temperature | ° C. | 23 | 23 | 23 |
| Sealing time | s | 3 | 3 | 3 |
| Sealing pressure | N | 300 | 300 | 300 |
| Speed test | mm/min | 200 | 200 | 200 |
| Strength Max@ 90° C. | N | 2.6 | 0.1 | |

TABLE 10-continued

| Sealing properties<br>Sealing properties were determined according to ASTM 88<br>Sealing from the internal face (of the coil) to the internal face (of the coil) | | | | |
|---|---|---|---|---|
| | | FILM 1 | FILM 2 | FILM 6 |
| Avg. Strength Max@ 95° C. | N | 5.4 | | |
| Avg. Strength Max@ 100° C. | N | 19.6 | 0.2 | 0.3 |
| Avg. Strength Max@ 110° C. | N | 31.5 | 0.8 | 2.5 |

TABLE 10-continued

| Sealing properties<br>Sealing properties were determined according to ASTM 88<br>Sealing from the internal face (of the coil) to the internal face (of the coil) | | | | |
|---|---|---|---|---|
| | | FILM 1 | FILM 2 | FILM 6 |
| Avg. | | | | |
| Strength Max@ 115° C. Avg. | N | | 2.9 | |
| Strength Max@ 120° C. Avg. | N | 42.1 | 32.3 | 6.4 |
| Strength Max@ 125° C. Avg. | N | | | 33.6 |
| Strength Max@ 130° C. Avg. | N | 35.9 | 52 | 25.9 |
| Strength Max@ 135° C. Avg. | N | 39.1 | 54.4 | 38.6 |
| Strength Max@ 140° C. Avg. | N | 41.5 | 53.7 | 31.8 |
| Strength Max@ 150° C. Avg. | N | 41.3 | 54.6 | 29.4 |
| Strength Max@ 160° C. Avg. | N | 51.9 | 56.3 | 37.3 |
| Strength Max@ 230° C. Avg. | N | | | 82.7 |

From the sealing results, it can be seen that the SIT of the second film of FILM 6 was below 120° C.

The invention claimed is:

1. A laminate comprising at least a first film and a second film, wherein the laminate is characterized in that:
   - the first film is a machine-direction-oriented polyethylene film selected from a monolayered film or a multi-layered film comprising at least two layers; and
   - the second film is a biaxially-oriented polyethylene film or a machine-direction- oriented polyethylene film; wherein the second film has a sealing initiation temperature equal to or lower than 128° C. as determined by the method described in the description and the second film is selected from a monolayered film or a multi-layered film comprising at least two layers; wherein the single layer of the second film or at least one layer of the second film comprises a high-density polyethylene having a density of at least 0.945 g/cm$^3$ as determined according to ISO 1183-1:2012 at 23° C.,
   - wherein the second film comprises at least one layer being a complementary layer and made of a polymer selected from ethylene vinyl acetate, a plastomer, an elastomer, ethylene vinyl alcohol, a polymer of vinylidene fluoride, a copolymer of vinylidene fluoride, a poly (lactic acid), a polyamide, or any mixture thereof, and
   - wherein the first film and/or the second film being a machine-direction-oriented polyethylene film comprises at least one complementary layer having a first surface and a second surface, a first tie-layer adhesive bonded to the first surface and a second tie-layer adhesive bonded to the second surface of the complementary layer.

2. The laminate according to claim 1, wherein the first film comprises at least one layer comprising a high-density polyethylene having a density of at least 0.940 g/cm$^3$ as determined according to ISO 1183-1:2012 at 23° C.

3. The laminate according to claim 1, wherein the first film comprises at least one layer comprising a blend of at least two different polyethylenes, wherein the blend comprises from 60 to 99.9 wt. % of a high-density polyethylene based on the total weight of the blend; wherein the high-density polyethylene having a density of at least 0.940 g/cm$^3$ as determined according to ISO 1183-1:2012 at 23° C.

4. The laminate according to claim 1, wherein the first film is a multi-layered film and comprises one or two skin layers comprising high-density polyethylene having a density of at least 0.950 g/cm$^3$ as determined according to ISO 1183-1:2012 at 23° C.

5. The laminate according to claim 1, wherein the first film comprises two skin layers comprising polyethylene wherein the polyethylene of at least one skin layer has a density greater than the polyethylene of one or more inner layers selected from an intermediate layer or a core layer.

6. The laminate according to claim 1, wherein the first tie-layer and/or the second tie-layer comprise maleic anhydride grafted polyethylene.

7. The laminate according to claim 1, wherein the first film and/or the second film being a machine-direction-oriented polyethylene film comprises at least five layers.

8. The laminate according to claim 1, wherein the first film and/or the second film being a machine-direction-oriented polyethylene film has a thickness of at most 40 μm as determined by DIN ISO 4593.

9. The laminate according to claim 1, wherein the second film has a sealing initiation temperature equal to or lower than 125° C. as determined by the method described in the description.

10. The laminate according to claim 1, wherein the first film and/or the second film being a machine-direction-oriented polyethylene film comprises at least 80 wt. % of metallocene-catalysed polyethylene based on the total weight of the machine-direction-oriented polyethylene film.

11. The laminate according to claim 1, wherein the first film and/or the second film comprises at least one layer comprising a linear low-density polyethylene.

12. The laminate according to claim 1, wherein the first film and/or the second film comprises at least one layer comprising a linear low-density polyethylene being a copolymer of ethylene and 1-hexene.

13. The laminate according to claim 1, wherein the first film and/or the second film comprises at least one layer comprising a linear low-density polyethylene having a density of at least 0.910 g/cm$^3$ as determined according to ISO 1183-1:2012 at 23° C.

14. The laminate according to claim 1, wherein the first film and/or the second film comprises at least one layer comprising a linear low-density polyethylene having a melt index ranging from 0.1 to 3.0 g/10 min as determined according to ISO 1133-2005 at 190° C. under a load of 2.16 kg.

15. The laminate according to claim 1, wherein the first film and/or the second film comprises at least one layer comprising a high-density polyethylene; wherein the high-density polyethylene is a homopolymer of ethylene or copolymer of ethylene and 1-hexene.

16. The laminate according to claim 1, wherein the first film comprises at least one layer comprising a high-density polyethylene.

17. The laminate according to claim 1, wherein:
   - the first film and/or the second film comprises at least one layer comprising a high-density polyethylene having a melt index ranging from 0.1 to 3.0 g/10 min as determined according to ISO 1133-2005 at 190° C. under a load of 2.16 kg.

18. An article characterized in that it comprises the laminate according to claim 1.

19. A process for producing a laminate characterized in that it comprises providing a first film being a machine-direction-oriented polyethylene film being a monolayered film or a multi-layered film comprising at least two layers;

providing a second film is a biaxially-oriented polyethylene film a machine-direction-oriented polyethylene film wherein the second film has a sealing initiation temperature equal to or lower than 128° C. as determined by the method described in the description and is selected from a mono-layered film or a multi-layered film comprising at least two layers; wherein the single layer or at least one layer comprises a high-density polyethylene having a density of at least 0.945 g/cm$^3$ as determined according to ISO 1183-1:2012 at 23° C. and bounding together via lamination the first film and the second film to obtain a laminate according to claim 1.

20. The laminate according to claim 17, wherein the high-density polyethylene has a density of at least 0.940 g/cm$^3$ as determined according to ISO 1183-1:2012 at 23° C.

* * * * *